2,880,227

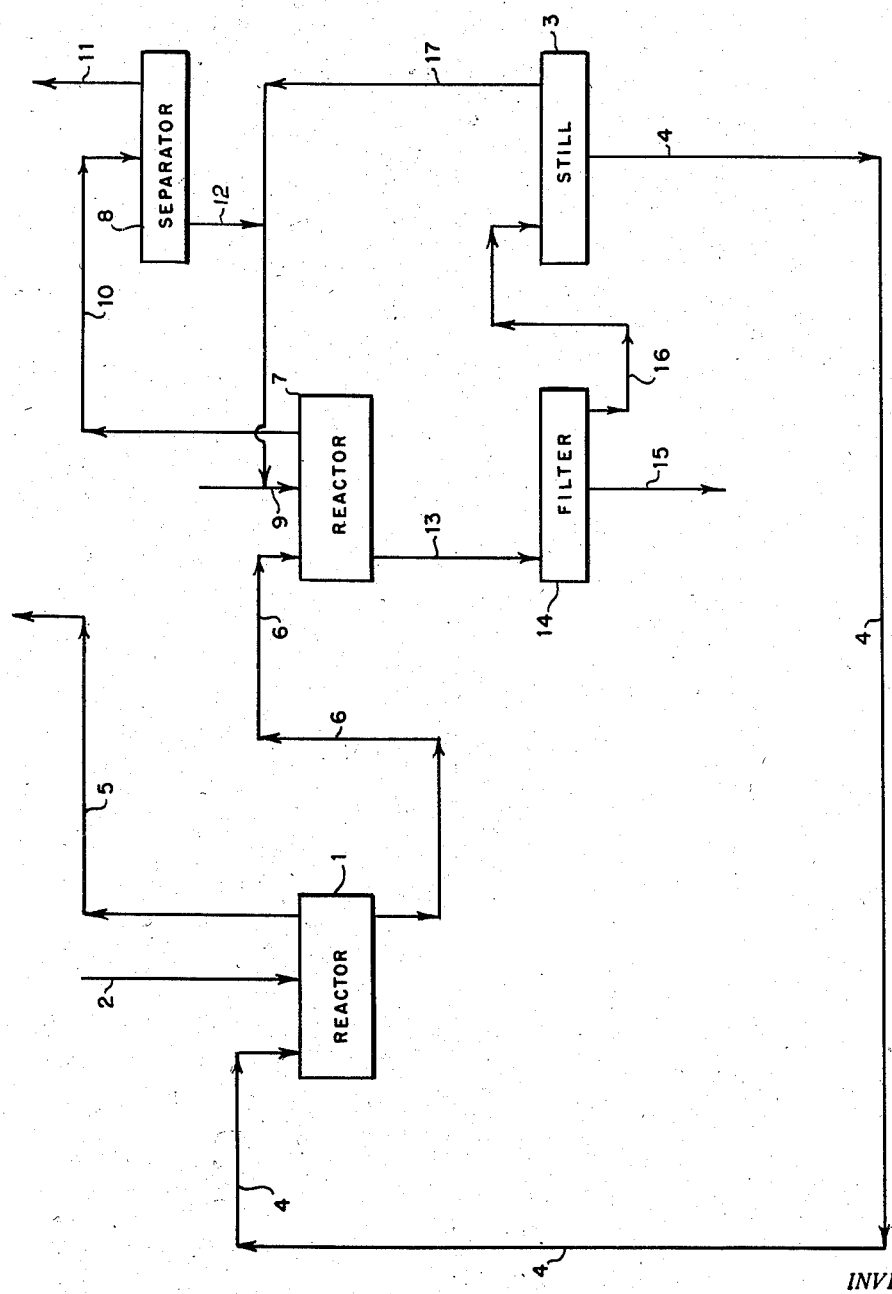

PROCESS FOR THE PREPARATION OF LOWER ALKYL BORATES

Charles O. Wilson, Jr., Covina, Calif., assignor, by mesne assignments, to Olin Mathieson Chemical Corporation, a corporation of Virginia Application July 22, 1955, Serial No. 523,737

14 Claims. (Cl. 260—462)

My invention relates to a process for the conversion of borate salts to akyl borates, and is particularly adapted for use in the recovery of the boron values present in borate-containing ores.

Boron-containing ores, for example those containing borax, are conventionally processed by preparing an aqueous solution of the ore, removing the insoluble gangue by filtration, and recovering the borax by crystallization. Alkyl borates are conventionally prepared from boric acid or boric oxide by reaction with an alcohol, such as methanol, and the process is complicated by the difficulty involved in separating the methyl borate from its azeotrope with water and methanol. Other ores, not containing borax as such, are conventionally treated initially with aqueous mineral acid, filtered, and the boric acid separated by fractional crystallization. It is economically unfeasible to recover boron values quantitatively from the ores by these conventional methods.

In accordance with my present invention, I have discovered a new process whereby boron salts can be conveniently converted in essentially quantitative yields into alkyl borates. The new process avoids the difficulties involved in controlled fractional crystallizations and separation of alkyl borates from their azeotropes with water and alcohol. The process also makes use of cheaper, economically available acid substances. Primarily the new process involves the use of a polyhydric alcohol, thereby forming high boiling, plastic-like polyborates in reaction with boric oxide and enabling removal of water from the ore-slurry before transesterification with a lower boiling alcohol to the desired alkyl borate. If boric acid is the desired end-product, the trimethyl borate-methanol azeotrope produced by the new process in accordance with one embodiment of my invention can be subjected to hydrolysis, the boric acid filtered off and the methanol recovered for recycle by distillation of the mother liquor. The boric acid can then be converted to boric oxide, if desired, according to currently practiced methods. The process involves the use of low-cost and readily available materials which in large part can be recovered and recycled for use in the treatment of further quantities of boron salts.

Thus, the process which I have devised comprises first preparing an aqueous admixture which contains a sodium or calcium borate or mixture thereof, a polyhydric alcohol, preferably a dihydric alcohol, of relatively high boiling point, generally within the range from about 175 to 375° C. at atmospheric pressure, and ammonium chloride or sodium acid sulfate. The mixture so prepared is then distilled with separation of water until the mixture is substantially anhydrous. Thereafter, the anhydrous mixture is admixed with a saturated aliphatic monohydric alcohol containing from 1 to 3 carbon atoms, and the reaction mixture is distilled with the borate ester of the saturated aliphatic monohydric alcohol being removed as overhead.

My process is illustrated by the following examples, which are to be considered as not limitative of my invention.

EXAMPLE I

This example illustrates a continuous process for the production of trimethylborate by reacting borax, ammonium chloride, and ethylene glycol, removing water and ammonia overhead by distillation, adding methanol to the reaction mixture, and then distilling trimethylborate overhead.

The apparatus used consisted of a three-necked, 1000 ml. flask equipped with a stirring assembly. An addition funnel was fitted in one neck of the flask. A short distillation column packed with glass helices, a variable take-off distillation head, a vacuum adapter and a receiver were fitted in series to the other neck of the flask. A U-tube was attached to the vacuum adapter outlet and contained standard acid solution during the distillation of water and ammonia to determine the liberated ammonia not dissolved in the aqueous distillate.

A mixture of 95.4 grams (0.25 mole) of Merck reagent grade, granular (about 50 mesh) borax, 26.8 grams (0.50 mole) of reagent grade, granular, Mallinckrodt ammonium chloride and 372 grams (338 ml., 6.0 moles) of Carbide and Carbon Chemicals Co. commercial ethylene glycol was placed in the flask. In order to produce a 10 percent aqueous ammonium chloride solution, assimilating the solution flowing from ammonia-soda plant, 241 grams of distilled water was then added to the mixture. After the water had been added, stirring and heating were begun simultaneously. The mixture was then distilled at atmospheric pressure at 98–100° C. with the removal of water and ammonia overhead. The water removed included: (1) the water added, (2) water of crystallization in the ore and (3) water of esterification. The mixture was then permitted to cool to room temperature and 268 grams (8.38 moles) of absolute methanol was added. After the methanol had been added, the mixture was stirred and heated to distill off overhead the trimethylborate-methanol azetrope (temp. 54° C.). When the vapor temperature of the distillate reached 60° C., the distillation was stopped, and the sodium chloride in the still pot which was in the form of well-defined crystals, was easily removed from the glycol-methanol residue by filtration. The excess methanol and remaining trimethylborate was distilled from the pot bottom filtrate and saved for recycle, leaving glycol containing some dissolved sodium chloride.

This glycol was used in cycle II in combination with additional borax and aqueous ammonium chloride. In cycle II make-up methanol was added in addition to the methanol distillate recovered from the glycol-methanol residue of cycle I.

Table I sets forth the experimental results obtained in seven cycles. In Table I, the moles are in gram moles.

Table I

| Cycle No. | Moles of Borax Added | Moles of Ammonium Chloride Added | Moles of Ethylene Glycol | Moles of Methanol | Ml. of Water Removed | Moles of Ammonia Formed | Moles of Sodium Chloride Formed | Moles of Trimethyl Borate (as Azeotrope) |
|---|---|---|---|---|---|---|---|---|
| I | 0.25 | 0.50 | 6.00 | 8.38 | 314 | 0.42 | 0.096 | 0.77 |
| II | 0.25 | 0.50 | 6.00 (recycled) | 3.76 (make-up) | 332 | 0.47 | 0.46 | 0.88 |
| III | 0.25 | 0.50 | 6.00 (recycled) | 5.00 (make-up) | 330 | 0.44 | 0.41 | 0.93 |
| IV | 0.25 | 0.50 | 6.00 (recycled) | 6.63 (make-up) | 380 | 0.55 | 0.62 | 1.28 |
| V | 0.25 | 0.50 | 6.00 (recycled) | 6.25 (make-up) | 387 | 0.52 | 0.46 | 1.14 |
| VI | 0.25 | 0.50 | 6.00 (recycled) | 8.13 (make-up) | 355 | 0.51 | 0.50 | 0.97 |
| VII | 0.25 | 0.50 | 6.00 (recycled) | 2.75 (make-up) | 336 | 0.52 | 0.54 | 0.96 |
| Totals | 1.75 | 3.50 | 42.00 | 40.90 | 2,434 | 3.43 | 3.09 | [1] 6.93 |

[1] Yield of trimethyl borate=99.0%.

In performing the seven cycles set forth in Table I, the average time required for the water removal step of each cycle was 4½ hours, the average time required for the removal of the trimethylborate-methanol azeotrope was about 5 hours, and the average time required for the removal of the excess methanol from the glycol-methanol residue was 2½ hours. Substantially quantitative yields of ammonia, sodium chloride and trimethylborate were obtained from each cycle after the fifth. I believe that the chemical reactions involved can be set forth by the equations:

(1) $Na_2B_4O_7 \cdot 10H_2O + 2NH_4Cl + 12HOCH_2CH_2OH \rightarrow 4B(OCH_2CH_2OH)_3{}^1 + 2NaCl + 17H_2O + 2NH_3$ (2) $4B(OCH_2CH_2OH)_3 + 16CH_3OH \rightarrow 4B(OCH_3)_3 \cdot CH_3OH + 12HOCH_2CH_2OH$ the overall equation being:

(3) $Na_2B_4O_7 \cdot 10H_2O + 2NH_4Cl + 16CH_3OH \rightarrow 4B(OCH_3)_3 \cdot CH_3OH + 2NaCl + 17H_2O + 2NH_3$

[1] It is to be understood that the product of boric oxide and glycol is a cross-linked, plastic, polymeric substance; but for sake of simplicity, the above formula is used.

EXAMPLE II

Table II below, in which the moles are in gram moles, sets forth the results obtained when various other embodiments falling within the scope of my invention were practiced. In each of the experiments, the boron compound, ammonium chloride and ethylene glycol or diethylene glycol were initially admixed and the reaction mixture was then distilled with removal of water and ammonia overhead until it was substantially anhydrous. The methanol was then added to the reaction mixture and a second distillation was performed to remove the methanol-trimethylborate azeotrope.

Kennedy Grind (200 mesh). It was reported to have the following composition:

| Component | Percent | Equivalent Element, Percent |
|---|---|---|
| $B_2O_3$ | 32.97 | B: 10.26. |
| $Na_2O$ | 4.89 | Na: 3.63. |
| CaO | 15.94 | Ca: 11.39 |
| $H_2O$ and Organics | 28.04 | |
| $SiO_2$ | 9.52 | |
| MgO | 3.54 | |
| $CO_2$ | 3.24 | |
| $Al_2O_3$ | 1.10 | |
| $Fe_2O_3$ | 0.30 | |
| $SO_3$ | 0.14 | |
| $P_2O_5$ | 0.066 | |
| Cl | 0.008 | |
| $As_2O_3$ | 0.006 | |
| Undetermined | 0.241 | |

The reported assay was rechecked, and the ore was found to contain 10.22 percent boron, 4.31 percent sodium, 12.96 percent calcium, and a total basicity as sodium hydroxide of 30.77 percent. Pure ulexite, based on its formula $NaCaB_5O_9 \cdot 8H_2O$, contains 13.34 percent boron, 5.67 percent sodium, 9.87 percent calcium, and 35.50 percent water of crystallization. Therefore, based on the boron content (10.24 percent), the ore was 76.8 percent pure.

The apparatus consisted of a 1000 ml. three necked round bottom flask equipped with a stirring assembly. A mercury-seal stirrer was used. A thermowell and an addition funnel were fitted in one of the side necks of the flask. The thermowell extended to within two inches of the bottom of the flask. A few milliliters of a high boiling organic liquid (heat transfer medium) and a thermometer were placed inside the thermowell. A distillation apparatus consisting of a distillation column, a variable take off distillation head, a straight vacuum adapter, and an addition funnel used as a receiver, all

Table II

| Expt. No. | Moles of Boron Compound | Moles | Moles of Solvent | Moles of Methanol | Percent Yield Trimethyl Borate | Percent Yield Ammonia |
|---|---|---|---|---|---|---|
| 1 | 0.25 Borax | 1.0 NH₄Cl | 5.3 Diethylene Glycol | [1] 3.1 | 86.0 | |
| 2 | 0.25 Borax | 1.0 NH₄Cl | 8.3 Ethylene Glycol | [1] 3.1 | 63.5 | 89.0 |
| 3 | 0.25 Na₂B₄O₇ | 0.50 [2] NH₄Cl | 6.4 Ethylene Glycol | 6.4 | 97.0 | 86.5 |
| 4 | 0.25 Borax | 0.50 [2] NH₄Cl | 6.0 Ethylene Glycol | 8.0 | 84.5 | 84.0 |

[1] Methanol volume held constant during distillation by introduction of methanol.
[2] 10% aqueous solution.

EXAMPLE III

The ulexite used in this work was obtained from the Pacific Coast Borax Company as "Gerstley Borate," the connected in series, was fitted in the other side neck of the flask. Two types of distillation columns were used; a column one foot long and ¾ inch in diameter packed with glass helices was employed during the distillation of water and ammonia, and a Snyder column ("floating ball" type with six single ball sections) was used during the distillation of the trimethyl borate-methanol azeotrope. A U-tube was attached to the vacuum adapter outlet by Tygon tubing; it contained standard acid during the distillation of water and ammonia, and distilled water during the distillation of the azeotrope. A glascol heating mantle was used as the source of heat for distillations.

The following is a general description of the procedure used: A mixture of about 100 grams of ore, 25–30 grams of ammonium chloride, 250–300 ml. of distilled water, and 400 ml. of ethylene glycol was stirred and heated in the flask. Water and ammonia were distilled together during a period of about five hours over a pot temperature range of 112–182° C. and a head temperature range of 97–100° C. The aqueous distillate (about 320–370 ml.) contained the water of esterification, water of crystallization from the ore, and the water originally added to make the ammonium chloride about ten percent aqueous. The reaction mixture remained in the form of a slurry throughout the distillation of water and ammonia. Methanol (400 ml.) was added to the cooled, non-aqueous glycol slurry, and the resultant slurry was heated. When the temperature of the reaction mixture rose to 75° C. the trimethyl borate-methanol azeotrope refluxed at 54° C. The azeotrope was distilled at a rate of about 25 ml. per hour. When the temperature of the refluxing vapor rose to 58° C., the distillation was stopped, and the distillate (about 150 ml.) was analyzed for trimethyl borate content. Near the end of the distillation of the azeotrope more methanol (about 100–150 ml.) was added so that the final volume ratio of ethylene glycol to methanol was about one to one.

The resultant glycol-methanol slurry was cooled to 20° C. and filtered through grade No. 2 Balston filter paper. A period of one half hour was required for the filtration. The cake was washed with a 100-ml. portion of methanol and dried in a vacuum oven at 70° C. and a pressure of about 300 mm. The cake consisted of undissolved ore and precipitated calcium and sodium chlorides. The filtrate then was subjected to distillation, and the methanol (about 500 ml.), which contained a small amount of trimethyl borate, distilled at 64–65° C. during a period of four hours. Both the methanol and the ethylene glycol, which is saturated at 20° C. with calcium and sodium chlorides, were reserved for use in subsequent cycles. The methanol which was consumed in the formation of the azeotrope was replaced by "make-up" methanol from cycle to cycle.

A summary of the data for each cycle of the ulexite process is recorded in Table III.

Table III

| Cycle No. | Ulexite | | Ammonium Chloride (moles) | Ethylene Glycol (Ml.) | Water (Ml.) | | Methanol (Ml.) | Ammonia | | Trimethyl Borate | | Remarks |
|---|---|---|---|---|---|---|---|---|---|---|---|---|
| | Grams | Moles of Boron | | | In | Out | | Moles | Percent Yield (per cycle) | Moles | Percent Yield (per cycle) | |
| I | 105.6 | 1.0 | 0.55 | 400 | 265 / 150 | 332 / 147 | 700 | 0.510 / 0.020 | 96.3 | 0.869 | 86.9 | 0.020 mole of NH₃ in Second water Dist. (147 ml.). No NH₃ in azeotrope. |
| II | 105.6 | 1.0 | 0.55 | | 265 / 100 | 335 / 100 | 200 (make-up) | 0.496 / 0.024 / 0.003 | 94.8 | 0.918 | 91.8 | 0.003 mole NH₃ in azeotrope. 0.024 mole NH₃ in second water dist. (100 ml.). |
| III | 105.6 | 1.0 | 0.50 | | 350 | 430 | 210 (make-up) | 0.442 / 0.077 | 103.8 | 0.809 / 0.131 | 94.0 | 0.077 mole NH₃ in azeotrope. 0.131 mole B (OCH₃)₃ dist'd. as complex with NH₃ in CH₃OH. |
| IV | 52.8 | 0.5 | 0.26 | | 200 | 263 | 212 (make-up) | 0.246 / 0.014 | 100.0 | 0.475 | 95.0 | 0.014 mole NH₃ in azetrope. |
| V | 105.6 | 1.0 | 0.53 | | 390 | 450 | 330 (make-up) | 0.434 / 0.088 | 98.4 | 0.940 / 0.015 | 95.5 | 0.088 mole NH₃ in azeotrope. 0.015 mole B (OCH₃)₃ dist'd. as complex with NH₃ in CH₃OH. |
| VI | 105.6 | 1.0 | 0.50 | | 300 | 380 | 375 (make-up) | 0.429 / 0.055 | 96.8 | 0.996 | 99.6 | 0.055 mole of NH₃ in azeotrope. |
| Totals | 580.8 | 5.5 | 2.89 | 400 | 2,020 | 2,437 | 2,027 | 2.838 | 97.9 | 5.153 | 93.7 | Total "Water In" does not include water of esterification and crystalization. |

The column labeled "Ammonia" in Table III shows that an average of about 90.3 percent of the ammonia in each cycle was distilled during the removal of water. The remainder of the theoretical amount of ammonia was obtained during the distillation of methanol and trimethyl borate. Near the end of the distillation of azeotrope (54° C.) a white solid (presumably the complex

$$(H_3N:B(OCH_3)_3)$$

formed on the cold finger. The condenser water was shut off, and the hot methanol vapor was allowed to wash the ammonia and trimethyl borate from the solid into the distillate through the pressure equalizer arm on the distillation head. Usually about three or four hours of reflux and washing were required to obtain a quantitative yield of ammonia.

The solids, consisting of undissolved ore and precipitated chlorides, from cycles one through six were combined, pulverized and sampled for analysis. The total weight of the combined solids was 201.4 grams. The analysis showed the solid to contain 0.16 percent boron, 17.11 percent chloride, 12.68 percent carbon dioxide, 13.81 percent calcium, and 10.80 percent sodium.

A material balance for boron over the six cycles showed that within experimental error (1) the solid wastes contained 0.56 percent, (2) the mother liquor from the last cycle contained 9 percent, and (3) the distilled trimethyl borate represented 94 percent of the boron charged into the system as ulexite. The sum is approximately 103 percent, and the reason may be due to accumulative experimental errors of analysis during the six cycles. The yield of ammonia recorded in Table III is based on the amount of ammonium chloride charged in each cycle, according to the following reaction:

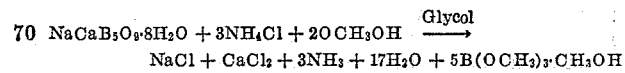

$$NaCaB_5O_9 \cdot 8H_2O + 3NH_4Cl + 20CH_3OH \xrightarrow{Glycol} NaCl + CaCl_2 + 3NH_3 + 17H_2O + 5B(OCH_3)_3 \cdot CH_3OH$$

EXAMPLE IV

The colemanite was acquired from the Pacific Coast

Borax Company and carries the trade name "Debeley Colemanite." The following composition was reported:

| Component | Percent | Equivalent Element Percent |
|---|---|---|
| $B_2O_3$ | 34.25 | B: 10.66 |
| CaO | 35.17 | Ca: 25.10 |
| $Na_2O$ | 0.39 | |
| MgO | 0.96 | |
| $SiO_2$ | 2.04 | |
| $Al_2O_3$ and $Fe_2O_3$ | 0.59 | |
| $CO_2$ | 12.30 | |
| $H_2O$ and Organics | 14.02 | |
| $SO_3$ | 0.26 | |
| S | 0.01 | |
| Undetermined | 0.01 | |
| Total basicity as NaOH | 27.05 | |

The reported analysis was rechecked, and the ore was found to contain 9.82 percent boron, 21.24 percent calcium, 8.64 percent carbon dioxide, and a total basicity as sodium hydroxide of 27.05 percent. A value of 9.82 was used as the percentage of boron in colemanite. This value was obtained by digesting a sample of the ore in strong hydrochloric acid, neutralizing with sodium hydroxide, adding mannitol, and titrating for the boric acid with standard base. Pure colemanite, based on its formula $Ca_2B_6O_{11} \cdot 5H_2O$, contains 15.80 percent boron, 19.50 percent calcium, and 21.9 percent water. Therefore, based on the boron content (9.82 percent), the "Debeley Colemanite" is 62.20 percent pure.

The apparatus used in this example was identical with that used in Example III, with the exception that a Tru-Bore stirrer was employed instead of the mercury-seal stirrer employed in Example III. Furthermore, the work was done in accordance with the general procedure which has been already described for Example III. Data for each cycle of the experiment are recorded in Table IV.

percentage of boron. The cycle III solid contained 0.81 percent boron, 0.34 percent chloride, 23.92 percent calcium, and no sodium or ammonium salts. In all, the salts from the five cycles contained an equivalent of 0.313 mole of boron or 7.65 percent of the amount originally charged in the ore.

A material balance for the five cycles indicated that within experimental error (1) the solid wastes contained 8 percent, (2) the mother liquor from the last cycle contained 11 percent, and (3) the distilled trimethyl borate represented 87 percent of the boron charged into the system as colemanite. The sum is 106 percent, and there are two possible reasons for the relatively high value. First, several determinations for the boron content of colemanite were attempted, and an average of the two lowest values was used as the value for boron in colemanite (9.82 percent). Perhaps there was more boron in the ore than the figure represents. Secondly, the high value may be due to accumulative experimental errors in analyzing the azeotrope distillates during the five cycles.

The yield of ammonia recorded in Table IV is based on the amount of ammonium chloride charged in each cycle, according to the following reaction:

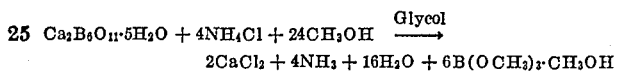

$$Ca_2B_6O_{11} \cdot 5H_2O + 4NH_4Cl + 24CH_3OH \xrightarrow{Glycol}$$
$$2CaCl_2 + 4NH_3 + 16H_2O + 6B(OCH_3)_3 \cdot CH_3OH$$

Various modifications can be made in the procedures of the specific examples set forth above to provide other embodiments which fall within the scope of my invention. Thus, in place of the borax, anhydrous sodium tetraborate and colemanite used as a starting material, there can be substituted other sodium or calcium borates, or ores containing sodium or calcium borates, for example, sodium metaborate, ulexite (boronatrocalcite), kernite and probertite. Likewise, in place of the ammonium chloride, there can be substituted an equimolar amount of sodium acid sulfate. Furthermore, in place of the ethylene glycol

*Table IV*

| Cycle No. | Colemanite | | Ammonium Chloride (moles) | Ethylene Glycol (Ml.) | Water (Ml.) | | Methanol (Ml.) | Ammonia | | Trimethyl Borate | | Remarks |
|---|---|---|---|---|---|---|---|---|---|---|---|---|
| | Grams | Moles of Boron | | | In | Out | | Moles | Percent Yield (per cycle) | Moles | Percent Yield (per cycle) | |
| I | 100.0 | 0.907 | 0.530 | 400 | 256 / 100 | 305 / 100 | 700 | 0.481 | 96.2 | 0.782 | 86.2 | 0.029 mole $NH_3$ in second water dist. (100 ml.) |
| II | 100.0 | 0.907 | 0.530 | | 350 | 405 | 256 (make-up) | 0.424 / 0.081 | 95.2 | 0.703 / 0.117 | 90.4 | 0.081 mole $NH_3$ in azeotrope. 0.117 mole $B(OCH_3)_3$ dist'd separately with $NH_3$ and $CH_3OH$. After dist'n of azeotrope. |
| III | 50.0 | 0.454 | 0.265 | | 200 | 260 | 112 (make-up) | 0.236 / 0.021 | 96.9 | 0.392 | 86.3 | Colemanite used was Ball milled four hours. |
| IV | 100.0 | 0.907 | 0.500 | | 350 | 423 | 338 (make-up) | 0.443 / 0.112 | 111.0 | 0.811 | 89.5 | 0.112 mole $NH_3$ in azeotrope. |
| V | 100.0 | 0.907 | 0.500 | | 300 | 350 | 395 (make-up) | 0.389 / 0.114 | 100.6 | 0.756 | 83.4 | Some boron lost as some Glycol was splashed out of flask. |
| Totals | 450.0 | 4.082 | 2.325 | 400 | 1,556 | 1,843 | 1,801 | 2.330 | 100.1 | 3.561 | 87.2 | Total "Water In" does not include water of esterification or of crystallization. |

In each cycle an average of about 14.58 percent of the theoretical amount of ammonia was removed during the distillation of trimethyl borate and methanol after an average of 85.42 percent of the ammonia had been distilled with water. Therefore, the same problem of the formation of the complex, probably $H_3N:B(OCH_3)_3$, was encountered in the colemanite process, as that described for ulexite.

Solids (159.4 grams) from cycles I, II, IV, and V were mixed, pulverized, and sampled for analysis. The results indicated 2.04 percent boron, 0.62 percent chloride, 19.24 percent carbon dioxide, and 25.69 percent calcium. There were no ammonium or sodium salts. The solid (16.8 grams) from the third cycle was analyzed separately, because the unreacted colemanite had been ball-milled for four hours prior to using in an attempt to extract a greater and diethylene glycol employed, there can be substituted an equimolar amount of a polyhydric alcohol which has a boiling point at atmospheric pressure within the range from about 175° to 375° C., for example, propylene glycol; trimethylene glycol; 1,3-butanediol; 1,4-butanediol; 2,3-butanediol; 2,4-pentanediol; 1,5-pentanediol; 1,6-hexanediol; 2,5-hexanediol; 2-methyl-1,3-pentanediol; 2-methyl-2,4-pentanediol; 2,4-heptanediol; 2,2-diethyl-1,3-propanediol; 2-ethyl-1,3-hexanadiol; triethylene glycol; dipropylene glycol; glycol; triethanolamine; and so forth.

As the specific examples illustrate, the relative amounts of sodium or calcium borate, ammonium chloride or sodium acid sulfate and alcohol present in the initial reaction mixture can be varied somewhat within the scope of my invention. In general, however, when ammonium chloride is employed as an initial reactant the chlorine present therein should be approximately equivalent to the sodium or calcium present in the sodium or calcium borate employed. Likewise, when sodium acid sulfate is used as a starting material, the sulfate present therein should be approximately equivalent to the sodium or calcium present in the sodium or calcium borate used as an initial reactant. The amount of alcohol (ethylene glycol or equivalent) employed as an initial reactant will generally be within the range from approximately 4 to 20 gram moles per gram atom of boron present in the sodium or calcium borate starting material. Finally, in place of the methyl alcohol used as a reactant, there can be substituted other lower saturated aliphatic monohydric alcohols containing from 1 to 3 carbon atoms, for example ethyl alcohol or either of the propyl alcohols. The amount of this particular alcohol can be varied considerably, generally about eight gram moles thereof per gram atom of boron present in the sodium or calcium borate starting material being used.

The accompanying drawing sets forth a flow sheet illustrating a process falling within the scope of my invention for the production of trimethylborate. In the drawing, borax decahydrate, ethylene glycol and a 10 percent by weight aqueous solution of ammonium chloride are fed into a reactor 1 through line 2, together with recycle ethylene glycol containing some dissolved sodium chloride from still 3 through line 4. In reactor 1, the reaction mixture is dehydrated by distillation to produce a mixture of water and ammonia as an overhead through line 5 and a mixture of sodium chloride, ethylene glycol, borate and excess ethylene glycol as bottoms through line 6. The product passing through line 6 is fed to reactor 7, together with methanol overhead from still 3, methanol bottoms from separator 8 and fresh methanol from storage (not shown), all of which methanol materials enter reactor 7 through line 9. From reactor 7, the trimethylborate-methanol azetrope is distilled overhead through line 10 to separator 8, in which trimethylborate is removed as overhead through line 11 and methanol as bottoms through line 12, the separation effected in separator 8 being performed using conventional means. From reactor 7, the reaction slurry passes through line 13 to filter 14, wherein solid sodium chloride is separated, being removed through line 15, and from which a mixture of ethylene glycol and methanol passes through line 16 to still 3. In still 3, methanol is removed as overhead through line 17 and ethylene glycol as bottoms through line 4.

I claim:

1. A process for the conversion of a borate salt to an alkyl borate which comprises preparing an admixture of an inorganic borate salt wherein the non-metallic element attached to the boron atom is oxygen selected from the group consisting of sodium salts and calcium salts and mixtures thereof, a polyhydric alcohol boiling within the range from about 175 to 375° C. selected from the group consisting of primary and secondary alkyl dihydric alcohols, di- and tri-alkylene glycols and triethanolamine, and a substance selected from the group consisting of ammonium chloride and sodium acid sulfate; distilling the mixture to separate the water therefrom until the mixture is anhydrous; cooling the anhydrous mixture; admixing the anhydrous mixture with an alkyl monohydric alcohol containing from one to three carbon atoms; and distilling the reaction mixture and removing the borate ester of the saturated alphatic monohydric alcohol as overhead.

2. The process of claim 1 in which the said borate salt is the sodium salt.

3. The process of claim 1 in which the said borate salt is borax.

4. The process of claim 1 in which the said borate salt is the calcium salt.

5. The process of claim 1 in which the said borate salt is colemanite.

6. The process of claim 1 in which the said borate salt is a mixture of the calcium and sodium salts.

7. The process of claim 1 in which the said borate salt is ulexite.

8. The process of claim 1 in which the said polyhydric alcohol is a dihydric alcohol.

9. A process according to claim 8 in which said dihydric alcohol is monoethylene glycol.

10. The process of claim 1 in which said substance is ammonium chloride.

11. The process of claim 1 in which said saturated aliphatic monohydric alcohol is methyl alcohol.

12. The process of claim 1 in which said borate salt is borax; in which said polyhydric alcohol is monoethylene glycol; in which said substance is ammonium chloride and in which said saturated aliphatic monohydric alcohol is methanol.

13. The process of claim 1 in which said borate salt is colemanite; in which said polyhydric alcohol is monoethylene glycol; in which said substance is ammonium chloride and in which said saturated aliphatic monohydric alcohol is methanol.

14. The process of claim 1 in which said borate salt is ulexite; in which said polyhydric alcohol is monoethylene glycol; in which said substance is ammonium chloride and in which said saturated aliphatic monohydric alcohol is methanol.

No references cited.